(12) United States Patent
Schmidt

(10) Patent No.: US 6,416,662 B1
(45) Date of Patent: Jul. 9, 2002

(54) WATER PURIFICATION APPARATUS

(75) Inventor: Ralph Michael Schmidt, East Melbourne (AU)

(73) Assignee: Austech Limited, Spotswood (AU)

( * ) Notice: Subject to any disclaimer, the term of this patent is extended or adjusted under 35 U.S.C. 154(b) by 0 days.

(21) Appl. No.: 09/890,451

(22) PCT Filed: Feb. 4, 2000

(86) PCT No.: PCT/AU00/00067

§ 371 (c)(1),
(2), (4) Date: Aug. 1, 2001

(87) PCT Pub. No.: WO00/46158

PCT Pub. Date: Aug. 10, 2000

(30) Foreign Application Priority Data

Feb. 4, 1999 (AU) .............................................. PP8505

(51) Int. Cl.[7] .............................................. B01D 11/02
(52) U.S. Cl. ..................... 210/198.1; 210/206; 210/501; 422/264; 422/277
(58) Field of Search .............................. 210/169, 198.1, 210/205, 206, 290, 437, 501, 503; 422/264, 276, 277, 278; 137/168

(56) References Cited

U.S. PATENT DOCUMENTS

| | | | |
|---|---|---|---|
| 3,578,776 A | | 5/1971 | Schneider, Jr. et al. |
| 3,946,902 A | | 3/1976 | Stepanek, Jr. |
| 4,199,001 A | | 4/1980 | Kratz |
| 4,303,515 A | | 12/1981 | Rademacher |
| 4,338,191 A | | 7/1982 | Jordan |
| 4,548,227 A | * | 10/1985 | Regunathan et al. |
| 5,384,102 A | * | 1/1995 | Ferguson et al. |
| 5,427,748 A | * | 6/1995 | Wiedrich et al. |
| 5,810,999 A | * | 9/1998 | Bachand et al. |
| 5,928,510 A | * | 7/1999 | Meredith |

* cited by examiner

Primary Examiner—David A. Simmons
Assistant Examiner—Fred Prince
(74) Attorney, Agent, or Firm—Nath & Associates PLLC; Gary M. Nath; Marvin C. Berkowitz

(57) ABSTRACT

A liquid purification apparatus having a main body having means to allow liquid to enter the main body is disclosed. An exit means allows exit of liquid from the main body. A solid compound is located within the main body for dissolution by the liquid. Means cooperating with the solid compound expose a substantially consistent surface area of the compound to the liquid.

21 Claims, 4 Drawing Sheets

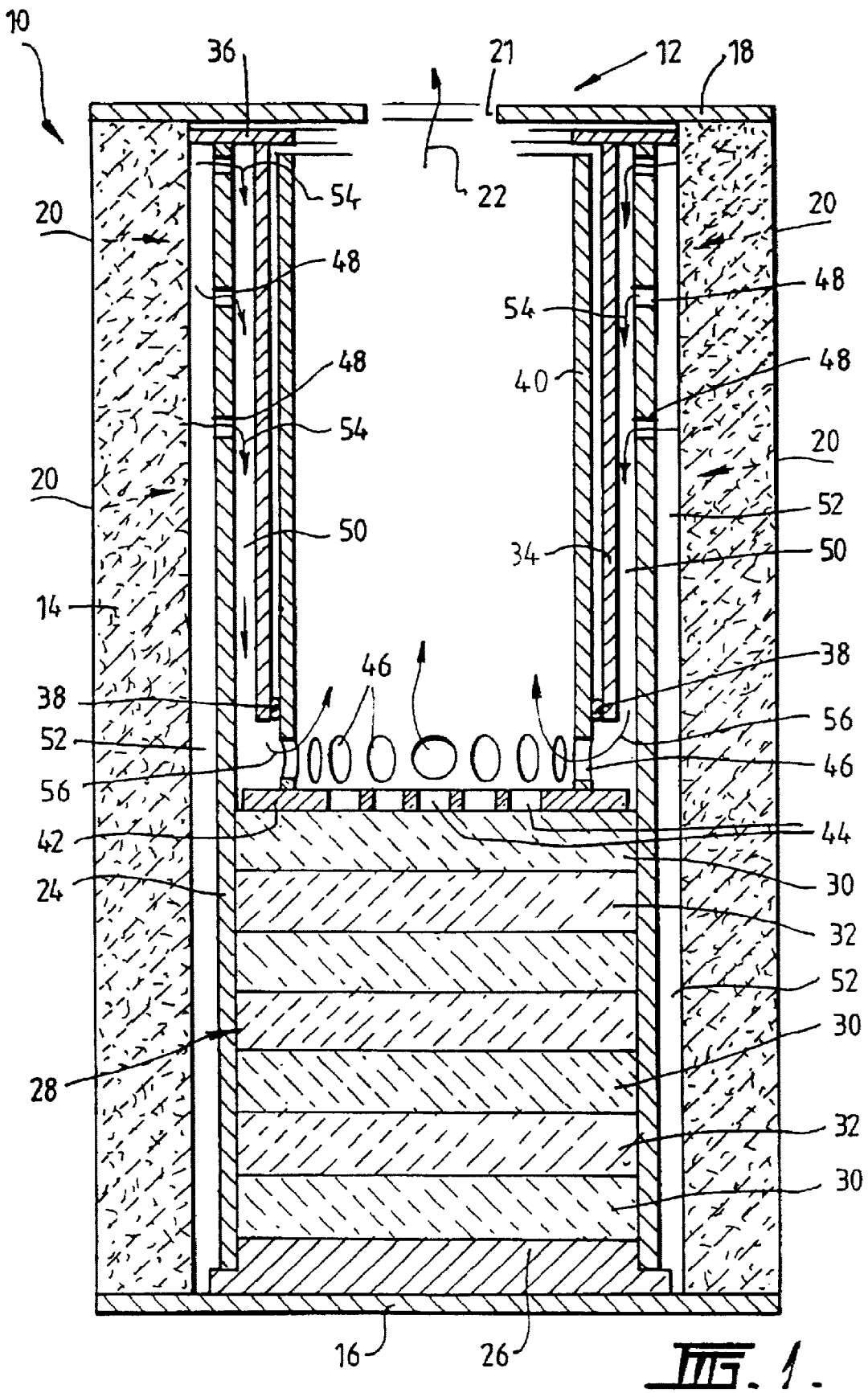

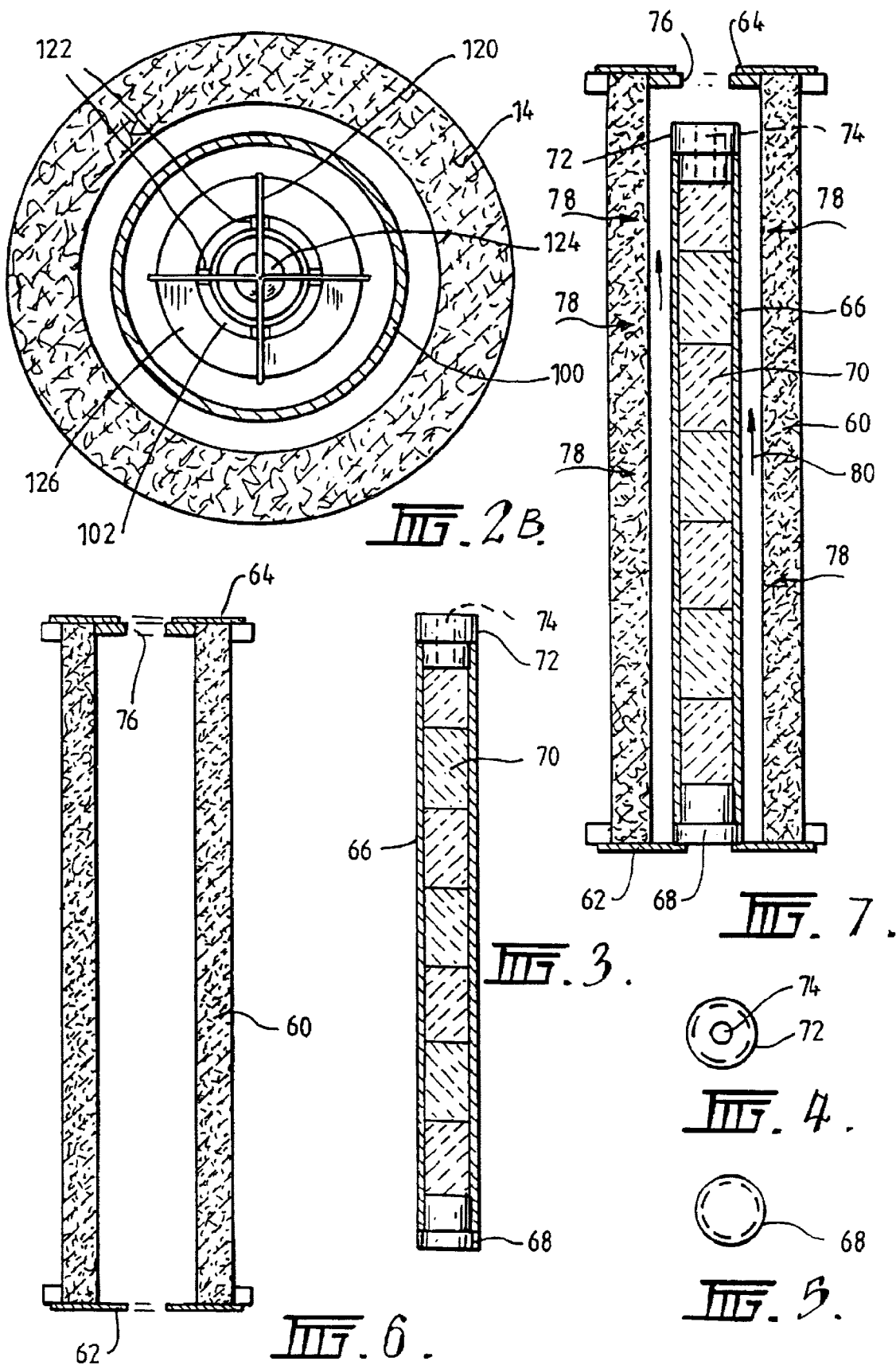

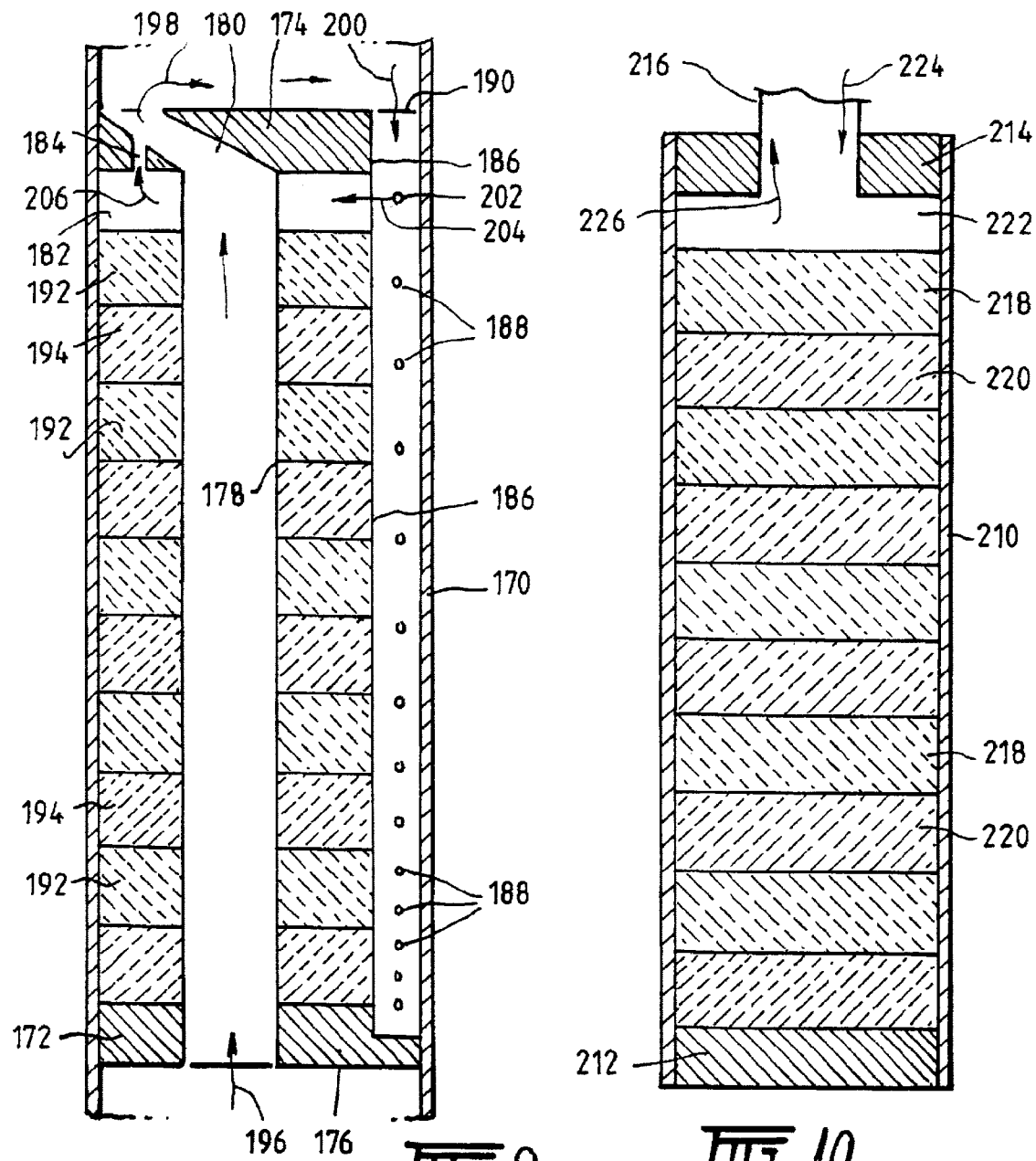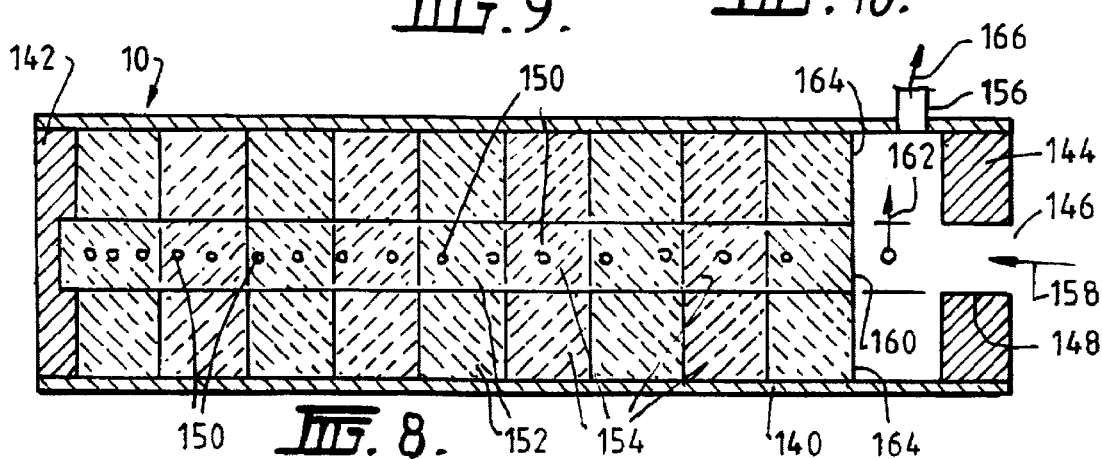

WATER PURIFICATION APPARATUS

This invention relates to a liquid purification apparatus and relates particularly, though not exclusively, to a liquid purification apparatus for purifying water and other liquids by the well-known process of oxidization purification using the sterilizing effects of oxygen radical ($O^-$).

As is well known, the combination of $H_2O_2$ and silver/copper makes an efficient biocide. When either $H_2O_2$, or a solid peroxygen compound that produces $H_2O_2$, is simultaneously added to minute amounts of silver, a catalytic reaction occurs increasing the efficiency of the $H_2O_2$ or the silver often used as a biocide. As a result, this process can be used to sterilize drinking water or water that may be in contact with humans, such as water in pools, spas and the like.

Various attempts have been made in the past to devise apparatus and methods for the effective use of $H_2O_2$ in solid form. However for a number of reasons success has not been attained. In consequence, no effective technology is currently available, due mainly to difficulties in the dissolution process and in controlling the dosages required. Many prior proposals have involved usage systems requiring labor intensive packaging in an endeavor to achieve accurate levels of one or more of three additives, namely $Ag^+$, copper and $H_2O_2$. For example, U.S. specification Pat. No. 2,105, 9835 of Krause prescribed individual packaging, using tablet form, enclosed in soluble wrappings which gradually dissolve encased in soluble crystals, powder mixes, adding to ice, and so forth. Likewise, United Kingdom Patent No. 432101 of Katadyn AG, discloses the use of packets, tablets, pills, capsules or ampoules, soluble coating of crystals or gelatine. Thus, in the prior art, the dosing of metals and $H_2O_2$ involves cumbersome procedures and apparatus, with the apparatus also being expensive to manufacture, and in the main only specific predetermined bodies of water can be treated.

Other problems with the prior art arises from the fact that the handling of solid peroxide compounds is hazardous and the difficulty in releasing a controlled dosage of oxygen radical over an extended period of time.

It is an object of the present invention to provide apparatus which will ameliorate at least some of the problems associated with the prior proposals by effectively controlling the release of $H_2O_2$ from a solid compound to allow the production of a diluted solution of a material which may be used available for catalyzation with the previously mentioned metals to produce the oxygen radical in a manner achieving both safety and increased efficiency of operation.

A further object of the invention is to provide apparatus of the type just described which will allow effective control of the dosing of oxygen radicals within an in-line flow passage for the water (or liquid), regardless of the volume being passed, or the actual flow rate, and regardless of contamination present which will require nil external energy or apparatus for dosing.

Yet another object of the invention is to provide such apparatus and usage methods which will ensure that the opportunity of the solid peroxide compounds to come into contact with the user will be eliminated, while at the same time the dosing system will allow the introduction of the oxidizing material while avoiding wastage of any products involved.

Other objects and advantages will be hereinafter apparent, such as providing advantages over the prior art in that the apparatus will not be subject to operation difficulties in areas where temperature variations may be extreme as the unit will be encompassed by the liquid to be treated.

With these and other objects in view the present invention provides a liquid purification apparatus including a main body having means to allow liquid to enter said main body, an exit means to allow exit of liquid from said main body, a solid compound located within said main body for dissolution by said liquid and means cooperating with said solid compound to expose a substantially constant surface area of said compound to said liquid.

Preferably said main body and said cooperating means is shaped to provide a tortuous path for flow of liquid before contact with said compound is made. Preferably said substantially constant surface area is planar. In a preferred embodiment said solid compound is located in a tubular container sealed at one end and having an opening into said tubular container at the other end. In a further practical embodiment said solid compound is located in a tubular container sealed at one end and having a perforated piston abutting the solid compound whereby said piston remains in contact with said solid compound as said solid compound dissolves. Preferably the length/height of the tubular container is greater than twice the effective diameter of the surface area exposed directly to liquid.

In order that the invention may be more readily understood and put into practical effect, reference will now be made to the accompanying drawings, in which:

FIG. 1 is a cross-sectional view of a first embodiment of a liquid purification apparatus;

FIG. 2B is a cross-sectional view along and in the direction of arrows 2—2 of FIG. 1;

FIG. 3 is a cross-sectional view of a cartridge for use in a third embodiment of a liquid purification apparatus;

FIG. 4 is a top view of the cartridge shown in FIG. 3;

FIG. 5 is a bottom view of the cartridge shown in FIG. 4;

FIG. 6 is a cross-sectional view of the holder for the cartridge shown in FIG. 3; and FIG. 7 is a cross-sectional view of the assembled cartridge of FIG. 3 and holder of FIG. 6 to form the third embodiment of the liquid purification apparatus;

FIG. 8 is a cross-sectional view of a fourth embodiment of a liquid purification apparatus;

FIG. 9 is a cross-sectional view of a fifth embodiment of a liquid purification apparatus; and FIG. 10 is a cross-sectional view of a sixth embodiment of a liquid purification apparatus.

Figure 2A:
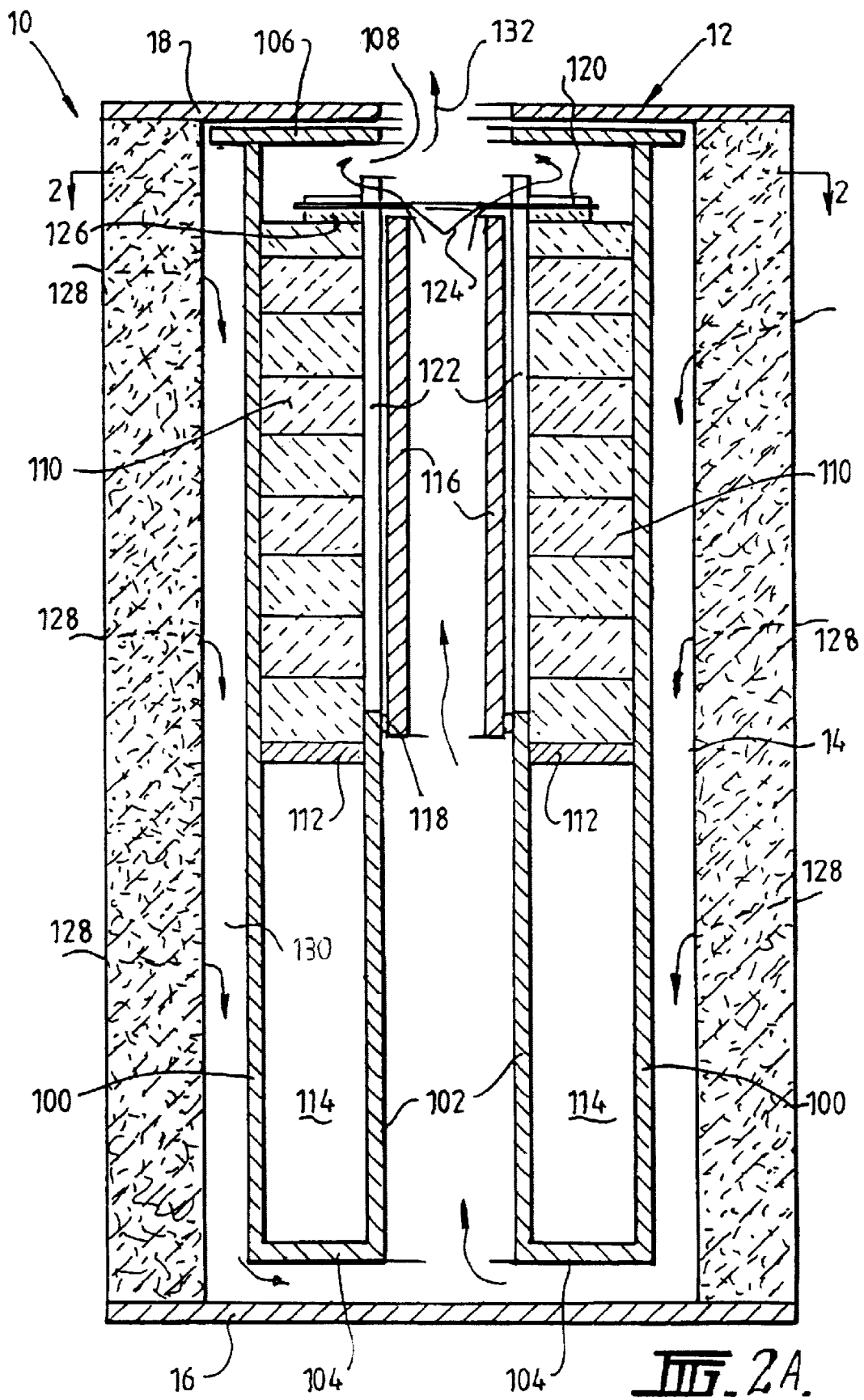
FIG. 2A is a cross-sectional view of a second embodiment of a liquid purification apparatus.

In FIG. 1 of the drawings there is shown a liquid purification apparatus 10 which has an enclosure 12. In this embodiment enclosure 12 comprises a cylindrical wall 14 having a base 16 and a cap 18. Base 16 and cap 18 are formed of an impervious material eg stainless steel, plastics material, etc whilst cylindrical wall 14 is formed of a porous, preferably micro porous material, to allow water to enter radially as indicated by arrows 20. Wall 14 may be formed of a ceramic or other suitable material. An aperture 21 provides an exit for treated water as indicated by arrow 22. A cylindrical shell 24 of impervious material is located within cylindrical wall 14 and is sealed at the bottom with an impervious plug 26. Sitting on plug 26 is a solid peroxygen compound 28.

The solid peroxygen compounds, e.g. sodium percarbonate or $Na_2S_2O_4$ and $K_2S_2O_4$ preferably have a coating of MgO. The coated compound may be compressed into different layers 30,32 in stages of preferably no greater than 15% of the total compound used. The pressure used to compact the blended peroxygen compounds create a semi impermeable medium when in contact with a liquid and is dissolved by the liquid releasing the peroxygen particles/molecules into the liquid. Naturally, the compressed blended peroxygen compounds that were previously compressed in its dehydrated form will now act as a wick—allowing a minute amount of moisture to permeate through the blended peroxygen compounds. By using this wicking action, it is possible to initiate either a release of peroxygen molecules or $H_2O+O^-$ by introducing a catalyzing element (not shown) either upstream where traces of the catalyzing element will be immediately available upon the dissolution of the peroxygen compound or downstream where peroxygen compound is released on dissolution of the $H_2O_2$ compound.

A co-axial sleeve 34 is attached to an annular ring 36 together with the top end of cylindrical shell 24. Sleeve 34 protrudes about half the axial length of shell 24 and has a seal 38 adjacent the end thereof. A piston 40 is co-axially located within sleeve 34 and slides through seal 38. The crown 42 of piston 40 has perforations 44 to allow liquid access to peroxygen compound 28 and rests on the compound 28. Apertures 46 are also provided in cylindrical shell 24 adjacent crown 42 to allow liquid to enter piston 40. Cylindrical shell 24 has apertures 48 in the upper half thereof to allow liquid to pass into the gap 50 formed between cylindrical shell 24 and sleeve 34.

In use, liquid passes radially through cylindrical wall 14 as indicated by arrows 20 and enters the gap 52 formed between cylindrical wall 14 and cylindrical shell 24. The liquid passes across gap 52 to enter apertures 48 as indicated by arrows 54 into gap 50. The liquid travels downwardly as indicated by arrow 56 through apertures 46 into piston 40. Annular ring 36 and seal 38 prevent any upward exit of liquid. Liquid can then pass through perforations 44 to contact the peroxygen compound 28 to cause dissolution thereof. The liquid and entrained peroxygen molecules $H_2O+O^-$ can exit as indicated by arrow 22. This embodiment is optimized for a flow of liquid that is constant but not necessarily continuous and allows for high and very high flow rates. As the compound 28 is dissolved piston 40 will move downwardly to maintain its abutting position with the compound. Compound 28 has only one surface exposed to the liquid and so will only dissolve along that surface. This results in a constant dissolution rate as the exposed surface area of compound remains constant. In the prior art the compounds normally shrink in size to have a variable reduced exposed surface area. Such reductions can result in the concentration of the dissolved compound reducing to a level which is ineffective. Such ineffective levels can be hazardous if water purification is involved. The invention avoids these problems with the constant exposed surface area.

Referring to FIGS. 2A and 2B there is shown an embodiment that is optimized for a flow of liquid that varies but is not necessarily continuous. This embodiment is very similar in operation to the embodiment shown in FIG. 1 and the same reference numerals will be used for similar integers to those discussed with reference to FIG. 1 to avoid duplication of description. Located within cylindrical wall 14 is an outer tube 100, a coaxial inner tube 102 and an annular base 104 which links the tubes 100,102 to form an annular type tube. An annular cap 106 is attached to the open end of outer tube 100 to form with the open end of inner tube 102 an annular exit port 108. The peroxygen compound 110 is in the upper half of enclosure 12 in contrast to the position of the compound 28 in FIG. 1. An annular base plate 112 is fitted inside the cavity 114 formed between outer and inner tubes 100, 102 to provide support for the peroxygen compound 110. A coaxial inner sleeve 116 slides within inner tube 102 and has a seal 118 to prevent liquid leakage. Sleeve 116 is prevented from rotation by rods 120 which move within narrow slots 122 cut into inner tube 102. A flow diverter 124 is fitted to rods 120 to direct liquid towards compound 110. An annular flange 126 is coupled to rods 120 and abuts the exposed surface of compound 110.

In use, liquid passes radially through cylindrical wall 14 as indicated by arrows 128 and enters the gap 130 formed between cylindrical wall 14 and outer tube 100. The liquid passes under annular base 104 to flow upwardly through the centre of apparatus 10 to pass through flow diverter 124. The liquid travels across annular flange 126 to contact the peroxygen compound 110 to cause dissolution thereof. Again there is only one surface of the compound 110 which is exposed to the liquid to allow a constant dissolution rate. The liquid and entrained peroxygen molecules can exit as indicated by arrow 132. As the compound 110 is consumed annular flange 126 will remain in contact with the compound and drop down the apparatus 10.

The embodiment in FIGS. 3 to 7 has a cylindrical wall 60 having a base 62 and a cap 64. Base 62 and cap 64 are formed of an impervious material eg stainless steel, plastics material, etc whilst cylindrical wall 60 is formed of a porous, preferably micro porous material, to allow water to enter radially as described with reference to FIG. 1. A cylindrical shell 66 of impervious material is sealed at the bottom with an impervious plug 68 which sealingly abuts base 62. Located within cylindrical shell 66 is a solid peroxygen compound 70 formed in a similar manner to the compound 28 in FIG. 1. An impervious plug 72 is sealingly fitted to cylindrical shell 66. A bore 74 allows liquid to contact the surface of compound 70. An aperture 76 in cap 64 allows exit of treated liquid from the apparatus.

In use, liquid enters cylindrical wall 60 radially as indicated by arrows 78. The liquid flows upwardly as indicated by arrows 80 and flows across the top of plug 72. Liquid can enter bore 74 to contact compound 70, again along one surface, for allowing dissolution thereof. Again a constant surface area will be exposed to provide a uniform concentration.

In the embodiment shown in FIG. 8 there is shown a liquid purification apparatus 10 which does not require a cylindrical wall 14,60 of porous material as described with respect to the previous embodiments. This embodiment is horizontally disposed and includes a cylindrical wall 140, a base 142 and an end cap 144. End cap 144 has an inlet 146 formed as the open end of an inner cylindrical tube 148. Tube 148 is perforated with apertures 150 to allow liquid to flow from inside tube 148 to enter the chamber formed by the inner face of cylindrical wall 140. Apertures 150 can be arranged to increase in density along tube 148 from inlet 146 to base 142. Solid peroxygen compounds have been compressed into different layers 152,154 are found in both tube 148 and cylindrical wall 140. An outlet 156 allows exit of liquid from the apparatus 10.

In use, liquid will flow into inlet 146 as indicated by arrow 158. The liquid will dissolve the exposed surface 160 of layer 152 inside tube 148 and can continue flowing through the first of apertures 150 as indicated by arrow 162. The liquid can then flow over the exposed surface 164 and exit through outlet 156 as shown by arrow 166. As the layers 152,154 are dissolved further of apertures 150 will be exposed to allow additional paths of flow from tube 148. The increasing density of apertures 150 along the tube 148 will assist in providing a more constant flow through apparatus 10. Although a single tube 148 is shown, there can be a plurality of such tubes. The tube(s) provide a greater lateral stability of the solid peroxygen layers 152,154 when the apparatus is in the horizontal position. Inlet 146 and outlet 156 may have tubes attached to increase/decrease the tortuous path of oxygen molecule diffusion.

The embodiment shown in FIG. 9 is a variation of the embodiment shown in FIG. 8. This embodiment is a vertically oriented device and includes a cylindrical wall 170, a base 172 and an end cap 174. Base 172 has an inlet 176 formed as the open end of an inner cylindrical tube 178. Tube 178 has an outlet 180 which also leads into chamber 182 through a venturi 184. A further tube 186 is located against the inner wall of cylindrical wall 170 and is perforated with apertures 188 to allow liquid to flow from inside tube 186 to enter chamber 182. Apertures 188 can be arranged to increase in density along tube 186 from additional inlet 190 to base 172. Solid peroxygen compounds have been compressed into different layers 192,194 in chamber 182.

In use, this embodiment is set up as an in-line liquid purification apparatus. Liquid flows into tube 178 through inlet 176 (arrow 196) and exits through outlet 180 as shown by arrow 198. Outlet 180 has a smaller cross-sectional area than tube 178 and will cause a reduction of flow speed as it exits into a larger cross-sectional area formed by the extension of cylindrical wall 170. A portion of the exiting liquid will be drawn into further tube 186 as shown by arrow 200 and flow through aperture 202 into chamber 182 as shown by arrow 204. Liquid will circulate in chamber 182 to cause dissolution of compound 192 and will exit through venturi 184 as shown by arrow 206. The flow of liquid through tube 178 will assist in operation of the venturi. As the layers 192,194 are dissolved further of apertures 188 will be exposed to allow additional paths of flow from tube 186. The increasing density of apertures 188 along the tube 186 will assist in providing a more constant flow through the apparatus.

The embodiment shown in FIG. 10 is the simplest of the embodiments. The device consists of a cylindrical wall 210, a base 212 and an end cap 214. End cap 214 has a tube 216 which forms the inlet and outlet for the device. Solid peroxygen compounds have been compressed into different layers 218,220 in chamber 222. This embodiment allows a slow release of compound in view of the movement of liquid into and out of the same tube 216. Liquid will flow into chamber 222 as shown by arrow 224 and exit as shown by arrow 226. This embodiment can be left in pool of water where water passing tube 216 can enter and dissolve the compound.

The invention will be understood to embrace many further modifications as will be readily apparent to persons skilled in the art and which will be deemed to reside within the broad scope and ambit of the invention, there having been set forth herein only the broad nature of the invention and a certain specific embodiment by way of example.

What is claimed is:

1. A liquid purification apparatus including a main body having means to allow liquid to enter said main body, an exit means to allow exit of liquid from said main body, a solid compound located within said main body for dissolution by said liquid, said solid compound being formed of a layered solid peroxygen compound, and means cooperating with said solid compound to expose a substantially constant surface area of said compound to said liquid.

2. The liquid purification apparatus of claim 1, wherein said main body and said cooperating means is shaped to provide a tortuous path for flow of liquid before contact with said compound is made.

3. The liquid purification apparatus of claim 1, wherein said substantially constant surface area is planar.

4. The liquid purification apparatus of claim 1, wherein said solid compound is located in a tubular container sealed at one end and having an opening into said tubular container at the other end.

5. The liquid purification apparatus of claim 4, wherein said tubular container is annular in cross-section and liquid flows upwardly through the centre of said tubular container and is directed to flow over the exposed compound at the other end.

6. The liquid purification apparatus of claim 4, wherein the length/height of the tubular container is greater than twice the effective diameter of the surface area exposed directly to liquid.

7. The liquid purification apparatus of claim 4, further including a cylindrical container having impervious end caps with the cylindrical wall thereof being of a porous material and said main body is located within said cylindrical container whereby liquid passes through said cylindrical wall to enter said main body.

8. The liquid purification apparatus of claim 1, wherein said solid compound is located in a tubular container sealed at one end and having a perforated piston abutting the solid compound whereby said piston remains in contact with said solid compound as said solid compound dissolves.

9. The liquid purification apparatus of claim 8, wherein said tubular container has apertures above the level of said solid compound to allow access of said liquid to said solid compound.

10. The liquid purification apparatus of claim 1, wherein the dissolution of solid compound occurs at a faster rate when liquid flows.

11. The liquid purification apparatus of claim 1, wherein said compound is packed into a tubular container to allow exposure of said liquid to said compound from an open end of said tubular container.

12. The liquid purification apparatus of claim 11, wherein said tubular container is closed at the open end by a cap and a tube is attached to said cap to allow liquid to enter said tubular container through said cap.

13. The liquid purification apparatus of claim 12, wherein said liquid enters and exits said main body through said tube.

14. The liquid purification apparatus of claim 1, wherein said main body has a central perforated tube arranged in a co-axial arrangement with said main body, said compound being packed into said central perforated tube and said main body, whereby, in use, liquid entering said tube can flow over the compound inside said central perforated tube and flow through exposed perforations of said central perforated tube to also flow over the compound in said main body before exiting said main body.

15. The liquid purification apparatus of claim 1, wherein said main body includes a central tube passing through a base of said main body and an end cap at the other end, said end cap having a venturi means linking the inside of said main body with a reduced diameter portion of said tube to assist in drawing exiting liquid from said tube into a perforated tube located in said main body to allow contact of said liquid with said compound in said main body through exposed perforations.

16. A liquid purification apparatus including a main body having means to allow liquid to enter said main body, an exit means to allow exit of liquid from said main body, a solid compound located within said main body for dissolution by said liquid, means cooperating with said solid compound to expose a substantially constant surface area of said compound to said liquid, and said solid compound being located in a tubular container sealed at one end and having a perforated piston abutting the solid compound whereby said piston remains in contact with said solid compound as said solid compound dissolves.

17. The liquid purification apparatus of claim 16, wherein said tubular container has apertures above the level of said solid compound to allow access of said liquid to said solid compound.

18. A liquid purification apparatus including a main body having means to allow liquid to enter said main body, an exit means to allow exit of liquid from said main body, a solid compound located within said main body for dissolution by said liquid, means cooperating with said solid compound to expose a substantially constant surface area of said compound to said liquid, said solid compound being located in a tubular container sealed at one end and having an opening into said tubular container at the other end and a cylindrical container having impervious end caps with the cylindrical wall thereof being of a porous material and said main body is located within said cylindrical container whereby liquid passes through said cylindrical wall to enter said main body.

19. A liquid purification apparatus including a main body having means to allow liquid to enter said main body, an exit means to allow exit of liquid from said main body, a solid compound located within said main body for dissolution by said liquid, means cooperating with said solid compound to expose a substantially constant surface area of said compound to said liquid and said compound is packed into a tubular container to allow exposure of said liquid to said compound from an open end of said tubular container.

20. A liquid purification apparatus including a main body having means to allow liquid to enter said main body, an exit means to allow exit of liquid from said main body, a solid compound located within said main body for dissolution by said liquid, means cooperating with said solid compound to expose a substantially constant surface area of said compound to said liquid, said main body having a central perforated tube arranged in a co-axial arrangement with said main body, said compound being packed into said central perforated tube and said main body, whereby, in use, liquid entering said tube can flow over the compound inside said central perforated tube and flow through exposed perforations of said central perforated tube to also flow over the compound in said main body before exiting said main body.

21. A liquid purification apparatus including a main body having means to allow liquid to enter said main body, an exit means to allow exit of liquid from said main body, a solid compound located within said main body for dissolution by said liquid, means cooperating with said solid compound to expose a substantially constant surface area of said compound to said liquid, said main body including a central tube passing through a base of said main body and an end cap at the other end, said end cap having a venturi means linking the inside of said main body with a reduced diameter portion of said tube to assist in drawing exiting liquid from said tube into a perforated tube located in said main body to allow contact of said liquid with said compound in said main body through exposed perforations.

* * * * *